United States Patent [19]

Shenouda et al.

[11] 4,396,634

[45] Aug. 2, 1983

[54] SHRIMP ANALOG

[75] Inventors: Soliman Y. K. Shenouda, Tarrytown; Dreena A. Calabrese, Katonah; Earl J. Benjamin, New Rochelle, all of N.Y.

[73] Assignee: General Foods Corporation, White Plains, N.Y.

[21] Appl. No.: 404,670

[22] Filed: Aug. 3, 1982

Related U.S. Application Data

[63] Continuation of Ser. No. 281,803, Jul. 9, 1981, abandoned.

[51] Int. Cl.³ .............................. A23L 1/325; A23J 3/00
[52] U.S. Cl. .................................. 426/104; 426/274; 426/574; 426/643; 426/657; 426/513; 426/802
[58] Field of Search ............... 426/104, 274, 574, 643, 426/657, 802, 513

[56] References Cited

U.S. PATENT DOCUMENTS

| | | | |
|---|---|---|---|
| 3,712,821 | 1/1973 | Ronsivalli et al. | 426/274 |
| 3,852,484 | 12/1974 | Cabot | 426/104 |
| 3,852,505 | 12/1974 | Rubin | 426/370 |
| 4,000,331 | 12/1976 | Tanaka et al. | 426/574 |
| 4,092,435 | 5/1978 | Teijeiro | 426/643 X |
| 4,158,065 | 6/1979 | Sugino | 426/574 X |
| 4,303,688 | 12/1981 | Shimura et al. | 426/643 X |

*Primary Examiner*—Robert A. Yoncoskie
*Attorney, Agent, or Firm*—Joseph T. Harcarik; Thomas R. Savoie; Daniel J. Donovan

[57] ABSTRACT

A shrimp analog product with the taste, texture and appearance of real shrimp is prepared by: extracting from a fish the myofibrillar proteins; solubilizing the myofibrillar proteins with salt; adding to the solubilized protein a starch, flavor and an organic acid to form a paste; heat setting the paste to set the paste and denature the protein; shredding the heat set paste into filaments; mixing the filaments with a protein based binder followed by molding the mixture into shrimp-like pieces; and setting the filament-binder matrix to provide a cohesive shrimp analog product.

29 Claims, No Drawings

SHRIMP ANALOG

This is a continuation of application Ser. No. 281,803, filed July 9, 1981, now abandoned.

BACKGROUND OF INVENTION

Shrimp is a mainstay of the seafood diet in many parts of the world. Some of the characteristics of shrimp which make it a preferred seafood is that it has a bland taste (not a strong fishy taste), it is easy to prepare, it is preferrably white in color and has a consistant quality. While shrimp is a highly preferred seafood its availability is becoming limited with the amount of shrimp being caught each year reaching the maximum sustainable yield (i.e., the maximum allowable percentage of shrimp being caught in order not to deplete the stock of shrimp in the future). Thus, while the demand for shrimp keeps increasing, the availability of shrimp does not.

In view of the availability and cost of shrimp it has been desireable to produce shrimp analogs or shrimp-like products containing a percentage of shrimp in the product. However, in the past these analogs or shrimp-like products have been lacking in a number of regards, namely, they in general did not provide the nutritional or protein content of real shrimp, they lacked the overall hardness, chewiness and cohesiveness of real shrimp thereby lacking the eating texture and quality which the consumer has come to expect from real shrimp. These drawbacks have made shrimp analogs or shrimp-like products containing a percentage of shrimp, an unacceptable alternative to real shrimp.

Thus, it is a feature of this invention to produce a shrimp analog having the taste, texture and appearance of real shrimp.

It is a further feature of this invention to produce a shrimp-like product which may contain a percentage of shrimp while having the taste, texture and appearance of real shrimp.

It is still another feature of this invention to produce a shrimp analog having the hardness, chewiness and cohesiveness of real shrimp.

It is yet another feature of this invention to produce a shrimp analog out of fish protein and which contains the nutritional and protein content of real shrimp.

SUMMARY OF THE INVENTION

Briefly, the shrimp-analog product of this invention is prepared by: extracting from a fish the myofibrillar proteins; solubilizing the myofibrillar proteins with salt; adding to the solubilized protein a starch, flavor and an organic acid to form a paste; heat setting the paste to set the paste and denature the protein; shredding the heat set paste into filaments; mixing the filaments with a protein based binder followed by molding the mixture into shrimp-like pieces; and setting the filament-binder matrix to provide a cohesive shrimp analog product. Prior to the heat setting of the paste preferrably the paste is cold tempered to set the protein, followed by a first stage heat setting to provide a firmer and more cohesive texture to the resultant shrimp analog product.

DETAILED DESCRIPTION OF THE INVENTION

This invention prepares a shrimp analog product with the taste, texture, color and appearance of real shrimp. More specifically, the shrimp analog product has the hardness, chewiness and cohesiveness of real shrimp and has a bland, fresh shellfish taste (absent a fishy taste), as well as providing a nutritional and protein content similar to real shrimp. Further, the shrimp analog product has the shape, color and appearance of real shrimp.

Advantageously, the shrimp analog product is prepared from any one of a number of various fish species, such as mackarel, blue fish, sea trout, king fish, croaker, pollock, red snapper, scroud, whitting, etc. The use of underutilized fish species can result in a substantial cost savings, as compared to the cost of real shrimp, while obtaining a shrimp analog product with the nutritional value of shrimp. For example, the shrimp analog product will have a protein content within the range of about 15 to 25% by weight and a protein efficiency ratio of about 3, as compared to real shrimp which has a protein content of about 16 to 22% by weight with a protein efficiency ratio or about 3. Beneficially since the various fish species have a low cholesterol content the shrimp analog product will also have a low cholesterol content, as compared to real shrimp which generally has a higher cholesterol content.

The first step in preparing the shrimp analog product is to extract from the fish the myofibrillar proteins. This is accomplished by grinding and deboning the flesh of the fish, followed by repeated aqueous washings of the deboned flesh, preferably the wash solution having a low concentration of salt which is desireable as a processing aid, for example the wash solution containing 0.05 to 0.2% by weight sodium chloride. The by weight ratio of wash solution to fish for each washing is generally within the range of 1:1 to 20:1, preferably 3:1 to 10:1. This washing step extracts the soluble protein and other soluble portions of the fish leaving behind the myofibrillar proteins which are subsequently used to prepare the shrimp analog product. In general, the myofibrillar proteins are the group of proteins which build the muscles of the fish and are insoluble in water.

The water insoluble proteins, i.e. the myofibrillar proteins, which are left following the extraction process are then solubilized with salt. To solubilize the protein the salt is added in an amount sufficient to create an ionic strength of at least 0.3, preferably 0.4 to 1. The level of salt is generally within the range of 0.5 to 5% by weight of the myofibrillar protein. Appropriate salts include sodium chloride, potassium chloride, and other polyvalent salts such as tripolyphosphate, sodium phosphate, calcium gluconate, etc., and combinations thereof. The preferred salts are sodium chloride and tripolyphosphate because of taste considerations in the resultant shrimp analog product. Tripolyphosphate as a polyvalent salt is preferred as it is effective in raising the ionic strength to solubilize the myofibrillar proteins without an excess use of salt for taste considerations. Depending upon the species of fish and the color of the fish species used, it may also be desirable to employ an oxidizing agent, such as hydrogen peroxide, to whiten the color of the fish.

The solubilized myofibrillar proteins are then combined with a starch, a flavorant and an organic acid to form a paste which is subsequently used in preparing the shrimp analog product. Starch is a key ingredient for texture and as a stabilizer, providing stability to the protein during freezing and storage of the shrimp analog product. Any one of a number of starches may be used whether pregelatinized, gelatinized, raw or modified, including varities such as corn, potato, tapicoa, etc. In general, the starch if added to the paste at a level within the range of 0.05 to 25%, preferably 3 to 10% by weight of the paste. The addition of a flavoring agent is also key to the taste of the subsequently prepared shrimp analog product, it being generally preferred that a slightly sweet taste be incorporated by the use of a sugar or artificial sweetener. The sugar is the preferred flavorant as it also provides an additional function of acting as a bulking agent and providing additional stability, especially during frozen storage, and textural benefits to the subsequently prepared shrimp analog product. When a sugar is employed in the formulation, in general it is incorporated at a level of 0.5 to 15%, preferably 3 to 10% by weight of the paste.

The addition of an organic acid is also important to the shrimp analog product as it helps deflavor the fishy aroma and taste (neutralize the fishy characteristics) of the various fish species employed. The preferred organic acids are ascorbic acid (which also acts as an antioxidant) and acetic acid, with additional suitable organic acids including succinic acid and glutamic acid. These organic acids are generally employed at a level of 0.005 to 2%, preferably 0.05 to 0.5% by weight of the paste. An additional preferred ingredient which is added to the fish paste is a binder which is added in an amount effective to impart additional hardness and stiffness to the shrimp analog product. The preferred binder is egg white protein which is generally incorporated at a level of up to 10%, preferably 1 to 5% by weight of the paste.

After the paste is formed it is then heat set into a block to set the protein and solidify the structure, as well as denature the protein. Critically, the paste must be heat set for 0.25 to 10 minutes at 70° to 120° C., preferably 80° to 100° C., to effectively denature the protein and provide the desired texture. Prior to this heat setting-denatureing step, it has been found to be surprisingly beneficial to pretreat the paste with an additional cold tempering step and an additional heat setting stage which unexpectedly impart a firmer, harder, chewier and more cohesive texture to the shrimp analog product, which more closely resembles real shrimp. After, the paste is formed preferably it is first cold tempered for 0.25 to 20 hours at −5° to 15° C. to set the protein, preferably 1 to 10 hours at 0° to 10° C. Subsequent to the cold tempering and prior to the heat setting-denatureing step, the paste is then preferably heat set in the first stage for 0.5 to 30 minutes at 30° to 70° C., preferably 3 to 20 minutes at 40° to 60° C., to provide an even firmer texture to the resultant shrimp analog product. Following the first stage heat setting the paste is then subject to the heat setting-denaturing step in a second stage heat treatment.

Critical to preparing the shrimp analog product the heat set paste is then shredded into filaments, the filaments generally having a diameter within a range of 0.5 millimeters to 5 millimeters, preferably 1 to 3 millimeters. These filaments are then mixed with a binder, followed by molding the filament-binder mixture into shrimp-like pieces and setting the binder to provide a cohesive shrimp analog product. Appropriate binders include proteins such as milk-casien and egg albumin, alginates, albumins, etc. However, the preferred binder is the paste itself prior to being heat set. This paste is preferably mixed with the filaments at a level of 5 to 75% by weight of the shrimp analog product, with a level of 40 to 70% being preferred for a firmer, more cohesive texture, and a level of 10 to 30% being preferred for a softer and looser texture. The mixture is then molded followed by heat setting for 0.5 to 10 minutes to reach an internal temperature of greater than 65° C. To achieve a preferred shrimp analog product additional flavorants can be added to the filament-binder mixture prior to setting in order to provide a shrimp flavor which more closely resembles real shrimp. The preferred additional flavorant is ground real shrimp which provides a desireable flavor to the shrimp analog product. In general, the ground shrimp is added at levels up to 50% by weight of the shrimp analog product, preferably 5 to 20% by weight of the shrimp analog product.

The resultant shrimp analog product prepared as above, desireably has a taste, texture and appearance including the chewiness, hardness and cohesiveness as is observed in real shrimp. This shrimp analog product is then preferably frozen and stored. The shrimp analog product can be coated, such as with a batter or coating mix, optionally fried, and frozen, packaged and then distributed for use by the consumer. Beneficially, freezing will not deteriorate the textural attributes of the shrimp analog product.

EXAMPLE

Fresh seatrout was eviscerated, beheaded, washed and deboned using a meat-bone separator machine. One kilogram of the ground flesh was washed for 10 minutes in Hobart mixer with 7 liters of chilled (7° C.) solution containing 0.15% salt (NaCl). The washed meat was separated from the washing solution by filtering through cheese cloth. The washing cycles were repeated six times. The washed muscle proteins were then dewatered by spinning in basket centrifuge for 3 minutes.

The dewatered fish protein at a level of 805.5 grams was mixed in double jacketed hobart mixer (temperature 7° C.) for 10 minutes. Twenty grams of sodium chloride, and 2 grams of sodium tripolyphosphate were added to the washed proteins to create an ionic strength of 0.68 and mixing was continued for 20 minutes. Then 70 grams of sucrose, 70 grams raw potato starch, 30 grams of spray-dried egg albumin, 1 gram of ascorbic acid and 1.5 mililiters of 5% acetic acid were added to the protein to form the paste, and mixing was resumed for another 20 minutes. The 1000 grams of fish paste was kept in the refrigerator overnight (7° C. for 10 hours).

The paste at a level of 750 grams was packaged in 150×150×50 milimeter aluminum trays, and placed in 50° C. water bath for 20 minutes, then transferred into 90° C. water bath for 3 minutes. The heat-set blocks were cooled, sliced into filament-like shapes having a 2×2 milimeter thickness.

The final matrix for making the shrimp analog product was formed by mixing the 750 grams of sliced filaments, 250 grams of unheated fish paste, and 176 grams of ground shrimp together for 1 minute. Shrimp-shaped molds were filled with the matrix, and heat set at 100° C. for 3 minutes resulting in the shrimp analog product.

The shrimp analog product had the taste, texture and appearance of real shrimp. After freezing and storage no discernable loss of taste, texture or appearance was observed.

The hardness of heat-set fish paste blocks (before slicing into filaments) was tested with a penetrometer as follows: A precision-shell penetrometer, [G.C.A. Corp.] with 150 gram penetrometer cone-shaped needle was used to test the hardness of the heat-set blocks. For shrimp-like hardness, a heat set paste with penetrometer reading within the range 6.5 to 9.5 milimeters was acceptable, with the preferred range of 7.4 to 8.2 milimeters. This sample had a penetrometer reading of 7.8 milimeters.

The texture profile of the shrimp analog product (final product) was tested as follows: An Instron Universal Testing Machine, Model 1122 was used to characterize some of the textural parameter of shrimp, such as overall hardness, chewiness, and modified cohesiveness. Overall hardness is defined as the hardness of the shrimp on using incisors at initial bite. The overall hardness was measured as the force (in kilograms) required to deform the sample to 10% of its original hight. Chewiness is defined as the number of chews during mastication before the sample is ready to be swallowed. It is measured as the energy of work (in kilograms-centimeters) required for a 90% deformation. Modified cohesiveness is defined as the sensory cohesion of the sample (tender, chewy, tough, etc.) using molar teeth. It is calculated mechanically as the ratio of compressed energy required for a 90% and a 15% deformation, i.e. the ratio of area under 90% force deformation curve to area under a 15% force deformation curve.

The instrumental conditions for the Instron testing were:

| Load cell: | 500 Kg |
|---|---|
| Full scale load: | 2 and 200 Kg |
| Chart speed: | 200 mm/min |
| Crosshead speed: | 10 mm/min |
| No. of chews: | 3 per sample |
| Sample deformation: | 15%, 15% and 90% |
| No. of samples: | 8–13 |

The results of these measurements were:

| Textural Parameters | Real Shrimp | Shrimp Analog Product |
|---|---|---|
| Overall hardness | 120 | 129 |
| Chewiness | 27 | 30 |
| Modified Cohesiveness | 1690 | 1080 |

These measurements correlated with the sensory evaluations made by a panel of experts, and they showed that the shrimp analog had textural attributes and an eating quality which was very close to real shrimp. Specifically, the shrimp analog product had the hardness, chewiness and cohesiveness (tender, chewy) of real shrimp.

What is claimed is:

1. A process for preparing a shrimp analog product with the texture, flavor and appearance of real shrimp comprising:
   (a) obtaining from a fish the myofibrillar proteins;
   (b) solubilizing the myofibrillar proteins with a salt;
   (c) adding to the solubilized fish myofibrillar proteins from 0.05 to 25% of a starch, flavorant, and 0.005 to 2% of an organic acid to form a paste, all percents being by weight of the paste;
   (d) heat setting the paste for 0.25 to 10 minutes at 70° to 120° C. to denature the protein;
   (e) shredding the heat set paste into filaments;
   (f) mixing the filaments with a binder, followed by molding the mixture into shrimp-like pieces; and
   (g) setting the molded filament-binder mixture to provide a cohesive shrimp analog product.

2. Process of claim 1 further comprising heat setting the paste in a first stage for 0.5 to 30 minutes at 30° to 70° C., prior to step (d).

3. Process of claim 2 further comprising cold tempering the paste for 0.25 to 20 hours at −5° to 15° C., prior to heat setting.

4. Process of claim 3 wherein the paste further comprises a binder in an amount up to 10% by weight of the paste.

5. Process of claim 4 wherein the binder is egg white in an amount within the range of 1 to 5% by weight of the paste.

6. Process of claim 1 wherein the myofibrillar proteins are obtained by deboning and grinding the fish and washing the fish flesh with water to remove the water soluble components of the fish.

7. Process of claim 6 wherein the by weight ratio of wash water to fish is within the range of 1:1 to 20:1.

8. Process of claim 7 wherein the wash water contains 0.05 to 0.2% by weight of a salt.

9. Process of claim 1 wherein the myofibrillar proteins are solubilized with an amount of salt effective to create an ionic strength of at least 0.3.

10. Process of claim 9 wherein the salt contains a polyvalent salt and the amount of salt is effective to create an ionic strength of 0.4 to 1.0.

11. Process of claim 10 wherein the amount of salt is within the range of 0.5 to 5% by weight of the fish protein.

12. Process of claim 10 wherein the salt is sodium chloride and tripolyphosphate.

13. Process of claim 4 wherein the flavorant is a sugar added at a level of 0.5 to 15% by weight of the paste.

14. Process of claim 5 wherein the level of starch is 3 to 10%, and the level of sugar as a flavorant is 3 to 10%, and the level of acid is 0.05 to 0.5%, all percents being by weight of the paste.

15. Process of claim 14 wherein the acid is ascorbic acid and acetic acid.

16. Process of claim 1 further comprising treating the extracted fish proteins with an oxidizing agent to obtain a desired color.

17. Process of claim 3 wherein the paste is cold tempered at 0° to 10° C. for 1 to 10 hours.

18. Process of claim 17 wherein the paste is heat set in the first stage for 3 to 20 minutes at 40° to 60° C.

19. Process of claim 18 wherein the paste is heat set in step (d) for 0.5 to 10 minutes at 90° to 100° C., 20. Process of claim 1, 4 or 14 wherein binder added to step (f) is the paste of step (c) and is mixed with the filaments at a level of 5 to 75% by weight of the shrimp analog product.

21. Process of claim 20 further comprising adding up to 50% by weight of ground shrimp to the paste-filament mixture.

22. Process of claim 21 wherein 5 to 20% of ground shrimp is added to the paste-filament mixture.

23. Process of claim 20 wherein the filaments have a diameter within the range of 0.5 mm to 5 mm.

24. Process of claim 20 wherein the paste-filament mixture is heat set in step (g) by subjecting the molded mixture to internal temperatures of at least 65° C.

25. Process of claim 20 further comprising freezing the shrimp analog product.

26. Process of claim 20 wherein the level of paste is 40 to 70% by weight of the shrimp analog product.

27. Process of claim 20 wherein the level of paste is 10 to 30% by weight of the shrimp analog product.

28. Product prepared by the process of claim 1, 3, 12, 14, or 19.

29. Product prepared by the process of claim 21.

* * * * *